(12) United States Patent
Moriya et al.

(10) Patent No.: US 7,233,279 B2
(45) Date of Patent: Jun. 19, 2007

(54) METHOD AND DEVICE FOR DISTANCE MEASUREMENT BY PULSE RADAR

(75) Inventors: Masayoshi Moriya, Kawasaki (JP); Satoshi Ishii, Kawasaki (JP); Tetsuo Seki, Kawasaki (JP); Kazuaki Hamada, Kawasaki (JP); Kenji Oka, Kobe (JP); Akihiro Ohta, Kobe (JP)

(73) Assignees: Fujitsu Limited, Kawasaki (JP); Fujitsu Ten Limited, Kobe (JP)

( * ) Notice: Subject to any disclaimer, the term of this patent is extended or adjusted under 35 U.S.C. 154(b) by 100 days.

(21) Appl. No.: 11/019,378

(22) Filed: Dec. 23, 2004

(65) Prior Publication Data
US 2006/0055590 A1 Mar. 16, 2006

(30) Foreign Application Priority Data
Sep. 8, 2004 (JP) .............................. 2004-261479

(51) Int. Cl.
G01S 13/08 (2006.01)
G01S 13/12 (2006.01)
(52) U.S. Cl. ........................ 342/137; 342/134; 342/135
(58) Field of Classification Search ................ 342/134, 342/135, 137
See application file for complete search history.

(56) References Cited

U.S. PATENT DOCUMENTS

| 4,057,800 A | * | 11/1977 | Ganz ........................... 342/116 |
| 4,973,968 A | | 11/1990 | Hurd et al. |
| 5,923,282 A | * | 7/1999 | Honma et al. ............... 342/135 |
| 6,111,537 A | | 8/2000 | Andersson et al. |
| 6,639,546 B1 | | 10/2003 | Ott et al. |

FOREIGN PATENT DOCUMENTS

| EP | 0 184 424 | 6/1986 |
| GB | 2 335 103 | 9/1999 |
| JP | 60-29688 | 2/1985 |
| JP | 61-133885 | 6/1986 |

(Continued)

OTHER PUBLICATIONS

Matsuo Sekine, "Radar Signal Processing Technology", Institute of Electronics, Information and Communication Engineers (IEICE), Sep. 1991, pp. 1.7-17.

(Continued)

Primary Examiner—Ian J. Lobo
(74) Attorney, Agent, or Firm—Staas & Halsey LLP

(57) ABSTRACT

In order to provide the method and the device for distance measurement by pulse radar that securely eliminates the false echo from the distance over the detectable limit determined by the pulse generation cycle, the pulse radar comprises the pulse signal sending unit that generates the pulse signals with different cycles at OSC 9a~9c, switches to the predetermined intervals by OSC switch 10, and sends the pulse signal to targets, the reflected signal receiving unit that receives the reflected signals and stores the data in the RAM 25, the reflected signal data acquisition unit that obtains the data of each reflected signal, and the reflected signal identification unit that compares the intensity of the reflected signals obtained at the same lag time point during a certain time period after sending the pulse signal for reference and identifies the reflected signals of the sent pulse signal for reference.

12 Claims, 9 Drawing Sheets

FOREIGN PATENT DOCUMENTS

| | | |
|---|---|---|
| JP | 8-050174 | 2/1996 |
| JP | 8-146124 | 6/1996 |
| JP | 2000-111639 | 4/2000 |
| JP | 2004-184393 | 7/2004 |
| JP | 2004-239744 | 8/2004 |
| JP | 2004-264067 | 9/2004 |

OTHER PUBLICATIONS

Search Report for corresponding European Application No. 04030746.4 dated Jun. 28, 2005.

Patent Abstracts of Japan, vol. 2000, No. 07, Sep. 29, 2000 & JP 2000 111639 A (Mitsubishi Electric Corp), Apr. 21, 2000.

Patent Abstracts of Japan, vol. 010, No. 327 (P-513), Nov. 7, 1986 & JP 61 133885 A (NEC Corp), Jun. 21, 1986.

Office Action for corresponding European Application No. 04030746.4 dated May 24, 2006.

Notice of Rejection Grounds for corresponding Korean Application No. 2005-0004153 dated Aug. 28, 2006.

* cited by examiner

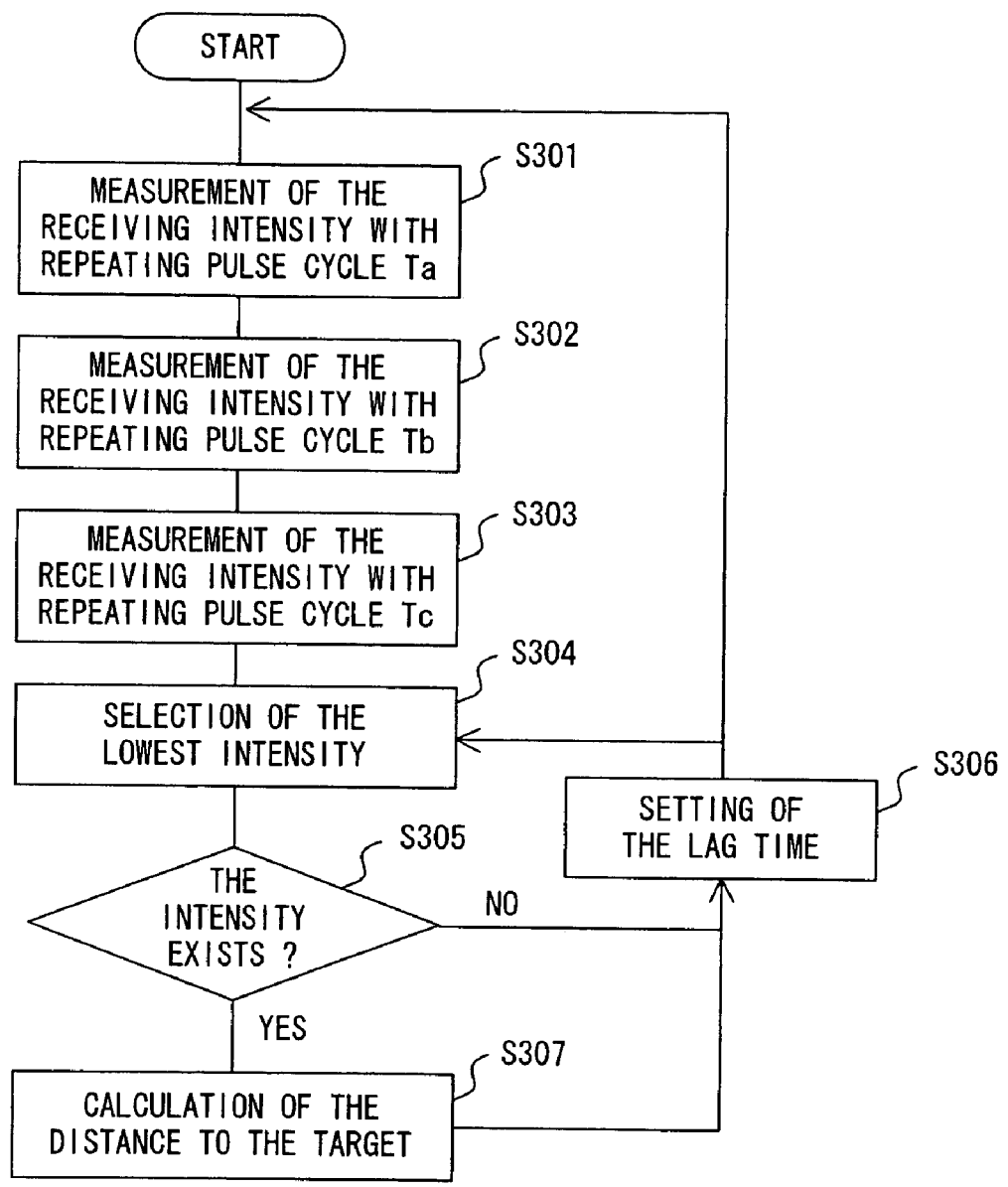
F I G. 3

| 26 REPEATING CYCLE Ta | |
|---|---|
| LAG TIME (nS) | RECEIVING INTENSITY ($\times 10^{-3}$ mW) |
| 6 | 33 |
| 20 | 21 |
| 24 | 12 |
| 38 | 23 |
| 66 | 33 |
| 80 | 21 |
| 84 | 12 |
| 98 | 23 |

| 27 REPEATING CYCLE Tb | |
|---|---|
| LAG TIME (nS) | RECEIVING INTENSITY ($\times 10^{-3}$ mW) |
| 6 | 33 |
| 10 | 21 |
| 24 | 12 |
| 38 | 23 |
| 76 | 33 |
| 80 | 21 |
| 94 | 12 |
| 108 | 23 |

| 28 REPEATING CYCLE Tc | |
|---|---|
| LAG TIME (nS) | RECEIVING INTENSITY ($\times 10^{-3}$ mW) |
| 6 | 33 |
| 24 | 12 |
| 30 | 21 |
| 38 | 23 |
| 56 | 33 |
| 74 | 12 |
| 80 | 21 |
| 88 | 23 |

| 29 REPEATING CYCLE Td | |
|---|---|
| LAG TIME (nS) | RECEIVING INTENSITY ($\times 10^{-3}$ mW) |
| 6 | 33 |
| 24 | 12 |
| 38 | 23 |
| 80 | 21 |

F I G. 5

METHOD AND DEVICE FOR DISTANCE MEASUREMENT BY PULSE RADAR

BACKGROUND OF THE INVENTION

1. Field of the Invention

The present invention relates to a method and a device for distance measurement by pulse radar that accurately measures the distance of the device to a target based on the reflected pulse signals that is a high-frequency signal sent from the device and reflected by the target.

2. Description of the Related Art

Generally, pulse radars transmit pulses that are modulated and have the designated frequency (76 GHz for car mounted radar, for example), and measure the distance of the radar to a target by calculating the lag time of the reflected pulse signal from the target.

FIG. 1A shows the pulse signal sent to four targets and its reflected pulse signals. Each chart shows (1) the single pulse signal, (2) the received signal, (3) the repeating pulse signal, and (4) the received signal.

Here, the received signal A1, B1, C1 and D1 are the reflected signals of the pulse signal S1 measured by the receiving unit of the pulse radar, and expressed by its intensity. The reflected signals are from the targets (target A, B, C and D), and each of those has a different distance from the signal sending point. Similarly, the received signal A2, B2, C2 and D2 are the reflected signals of the pulse signal S2 from the targets, and are expressed by their intensity.

As FIG. 1 (1) shows, when the single pulse signal S1 is transmitted, the reflected signals are returned from the targets detecting received signals A1, B1, C1 and D1. Here, the lag time of the received signal C1 and D1 from the point of the pulse signal generation is addressed as lag time $\tau1$ and lag time $\tau2$, respectively.

Meanwhile, as FIG. 1A (3) shows, when the repeating pulse signals with cycle T, a pulse cycle, is transmitted to the targets. Signals A1, B1, and C1 of the pulse signal S1 are detected within the same pulse cycle of the pulse signal S1. However, because lag time $\tau2$ of the received signal D1 is longer than the pulse cycle T, received signal D1 is detected as a receiving signal for the pulse signal S2. (The received signals like D1 in this example are hereafter addressed as ghost signals).

Accordingly, there is a limit that when the generation cycle of the pulse signal is $\tau$, and the longest measurable distance is L, generation cycle T of the pulse signal $\tau$ has to be longer than 2L/c (c is the speed of light), The time that a pulse signal is reflected by a target and returns to where it was transmitted. This is called the uncertainty of distance measurement by the repeating pulse.

Laser Processing Technology (Matsuo Sekine, IEICE), In order to eliminate the uncertainty of distance measurement by a repeating pulse, describes a pulse radar that removes echo utilizing the characteristic of the reflected pulse signal, that is, the farther the target is, the smaller the intensity of its reflection becomes.

Also, Japanese Publication Unexamined Application No. Showa61-133885 discloses a method to send a mixed pulse. A plurality of short pulses with different repeating cycles are mixed in one cycle of the long pulse repeating cycles and to eliminate the signals of the short pulse that appears at the different time points in every cycle where any of the sending pulse timing is referred as the reference pulse timing.

Japanese Publication Unexamined Application No. 2000-111639 disclosed a method to detect the target in a range that would correspond to the uncertainty of distance measurement; that is a round-trip of the distance requires a longer time period than the cycle of pulse generation by simultaneously generating a plurality of signals with different frequencies and detecting phase with N number of detectors.

However, the pulse radars for short distance measurement with Laser Processing Technology has a problem that ghost signals cannot be securely eliminated by separating reflection intensities. The process requires a short cycle of pulse generation to secure enough separation accuracy (resolution). This is a problem when the size and the reflection intensity of the targets differ greatly such as a car and a person, and especially when high accuracy is required for measurement of short distances.

Also, the disclosed method in Japanese Publication Unexamined Application No. Showa61-133885 only eliminates the intervention between pulses in long and short compound pulse radar; the method is not for the elimination of the echo (ghost signal) that exceeded the time cycle of pulse repetition.

The method in Japanese Publication Unexamined Application No. 2000-111639 requires a large structure for the device to send out a plurality of signals simultaneously and a phase detector to measure the distance. As explained above, it was difficult for a short pulse radar which enables highly accurate measurement over the distance range of about 10 cm to over 10 m to separate the ghost signals, that is reflected pulses from an object which is located beyond the detection distance limit for a repetition period, when pulse frequency repetition is increased to improve S/N (the ratio of signal to noise) of the received signal as it is shown in FIG. 1A. In addition, there are some cases that sending and receiving signal intervention, that is the pulse radar receives its own sending signal as receiving signal by mistake when the radar sends out a pulse signal, prevents the periodical detection of reflected signal.

Moreover, like the existing pulse radar for weather observation the use of long period pulses greatly increases the required electrical power at the point of pulse transmission in order to improve S/N, and causes problems in cost and circuit production.

SUMMARY OF THE INVENTION

The present invention is created in consideration of the above stated problems. It is the object of the present invention to provide the pulse radar that securely eliminates a false echo (ghost signal) from objects that are located beyond the measurable limit determined by the pulse period. It is another object of the present invention to provide a method and device for the distance measurement using pulse radar that enables measurement of distance that used to be limited by the pulse repetition period.

In order to achieve the object above, the pulse radar related to the present invention comprises the following:

a pulse signal generation unit for generating pulse signals with at least two different cycles;

a pulse signal switching unit for switching the pulse signals generated in the pulse signal generation unit in a predetermined interval and outputting the signals;

a pulse signal sending unit for sending the pulse signals from the pulse signal switching unit toward objects;

a reflected signal receiving unit for receiving reflected signals from the objects, and storing receiving data that contains at least data of receiving intensity of the reflected signals and a receiving time of the reflected signals in its storage unit;

a reflected signal data acquisition unit for obtaining reflected signal data of every reflected signal for all the pulse signals with different cycle from the receiving data stored by the reflected signal receiving unit; and a reflected signal identification unit for comparing the receiving intensity of the reflected signals received at the same lag time during a predetermined time period after a transmission of a pulse signal for reference on each of the reflected signal data obtained by the reflected signal data acquisition unit, and identifying the reflected signal as a reflected signal of the reference pulse signal only when all the receiving intensity compared is not substantially zero.

Also, the method of distance measurement by the pulse radar includes:

a pulse signal generation process that generates pulse signals with at least two different cycles;

a pulse signal switching process that switches the pulse signals generated in the pulse signal generation process in a predetermined interval and outputs the signals;

a pulse signal sending process that sends the pulse signals from the pulse signal switching process toward objects;

a reflected signal receiving process that receives reflected signals from the objects, and stores receiving data that contains at least a data of a receiving intensity of the reflected signals and a receiving time of the reflected signals in its storage unit;

a reflected signal data acquisition process that obtains reflected signal data of every reflected signal for all the pulse signals with different cycle from the receiving data stored by the reflected signal receiving process; and a reflected signal identification process that compares the receiving intensity of reflected signals received at the same lag time during a predetermined time period after a transmission of a pulse signal for reference on each of the reflected signal data obtained by the reflected signal data acquisition process, and identifies the reflected signal as a reflected signal of the reference pulse signal only when all the receiving intensity compared is not substantially zero.

BRIEF DESCRIPTION OF THE DRAWINGS

FIG. 3 is a flowchart describing the details of the reflected signal identification process.

FIG. 5 is the table of the measurement result of the reflected signal data of the reflected signal data 1 (Ta), the reflected signal data 2 (Tb), the reflected signal data 3 (Tc) only when the intensity exists.

DESCRIPTION OF THE PREFERRED EMBODIMENT

Figure 1A:
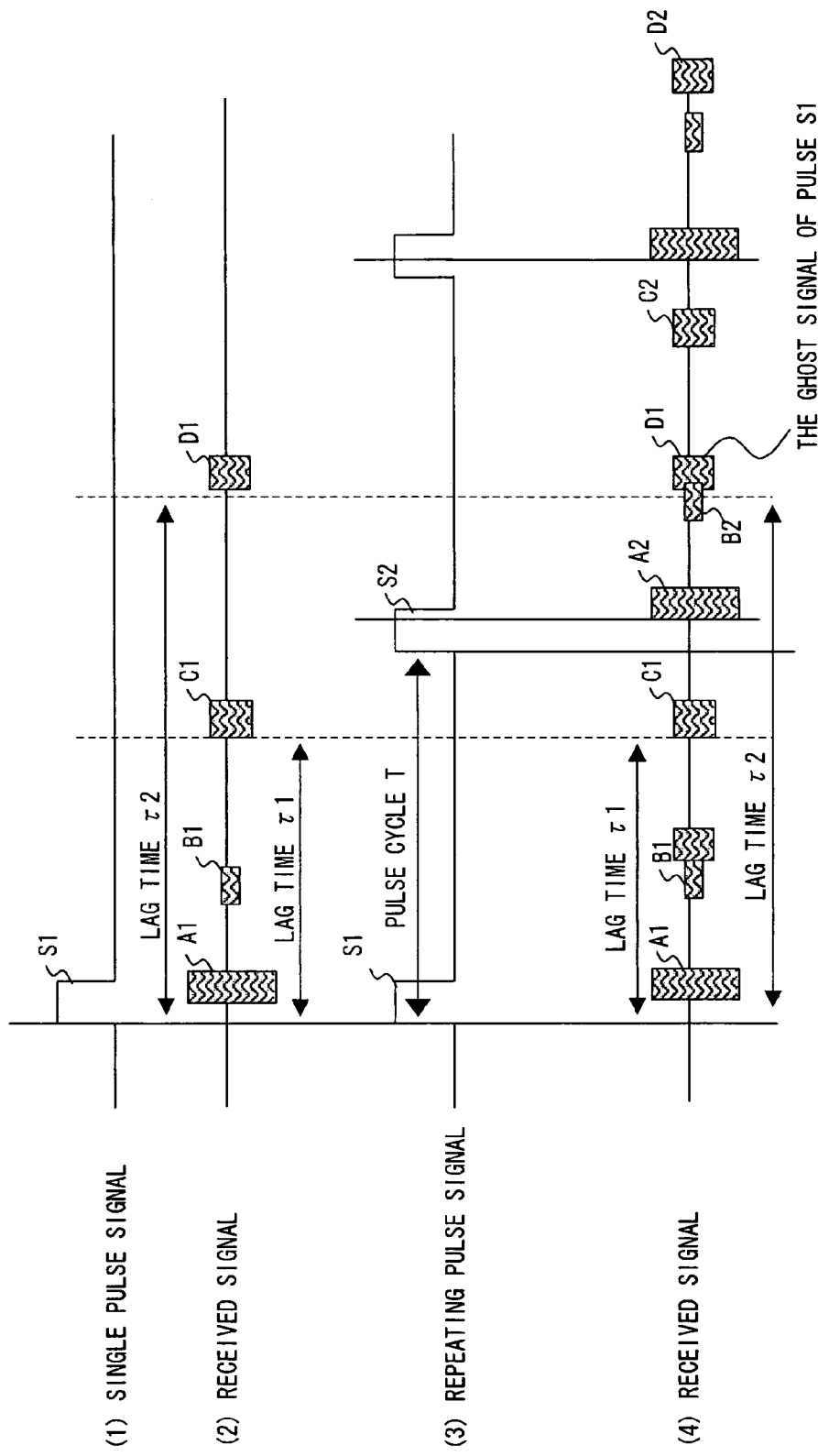
FIG. 1A is a chart that indicates examples of the pulse signals transmitted to four targets and their reflected signals by conventional pulse radar.

In order to solve the problem explained above, the pulse radar related to the present invention comprises the following:

a pulse signal generation unit for generating pulse signals with at least two different cycles;

a pulse signal switching unit for switching the pulse signals generated in the pulse signal generation unit in a predetermined interval and outputting the signals;

a pulse signal sending unit for sending the pulse signals from the pulse signal switching unit toward objects;

a reflected signal receiving unit for receiving reflected signals from the objects, and storing receiving data that contains at least data of receiving intensity of the reflected signals and a receiving time of the reflected signals in its storage unit;

a reflected signal data acquisition unit for obtaining reflected signal data of every reflected signal for all the pulse signals with different cycle from the receiving data stored by the reflected signal receiving unit; and a reflected signal identification unit for comparing the receiving intensity of the reflected signals received at the same lag time during a predetermined time period after a transmission of a pulse signal for reference on each of the reflected signal data obtained by the reflected signal data acquisition unit, and identifying the reflected signal as a reflected signal of the reference pulse signal only when all the receiving intensity compared is not substantially zero.

According to the present invention, the pulse signals with different cycles generated by the pulse signal generation unit are transmitted to the targets through the pulse signal switching unit that switches the pulse at a predetermined interval. Its reflected pulses are received in the reflected signal receiving unit, and are stored in the storage unit as received data.

At the reflected signal data acquisition unit, the reflected signal data of each reflected signal for the above-mentioned pulse signal with different cycles is obtained from the received data, and the reflected signal data is compared with the other reflected signal data obtained at the same lag time to the reflected pulse signal. When all the reflected signal data has the intensity that is not zero, the reflected signal is identified as the reflected signal of the above-mentioned reference pulse signal.

By taking this approach, when only one among the received signal data used for the comparison described above had the above non-zero intensity, the intensity is not identified as the reflected signal of the above-mentioned reference pulse signal transmitted to the targets. This method enables the secure elimination of the reflected signal (ghost signal) of the pulse signal that was transmitted to the targets before the reference pulse transmission.

It is also acceptable that the above-mentioned reflected signal receiving unit receives a reflected signal from the objects only in a requested time period, and stores data containing at least the receiving intensity of the reflected signal in the requested time period in the storage unit, and the reflected signal identification unit compares receiving intensity of the reflected signal in the requested time period on each of the reflected signal data obtained by the reflected signal data acquisition unit, and identifies the reflected signal as a reflected signal of the reference pulse signal only when all the receiving intensity compared is not substantially zero.

By this method, it becomes possible to quickly identify the reflected signal of the reference pulse signal in the requested time period because the reflected signals from the above-mentioned targets are received in the requested time (the lag time from the reference pulse signal transmission), and identified by the above-mentioned reflected signal identification unit.

By sliding the requested time period, quick identification of the existence of the reflected signals of the reference signal within the requested range of the lag time is achieved. That is, quick recognition of the target within the distance of the requested range.

It is also acceptable that the above-mentioned reflected signal receiving unit stores only data of receiving intensity of the reflected signal from the objects and of the lag time of the reflected signal in the storage unit.

In such way, it is possible to keep the capacity of the storage unit (RAM and EEPROM, for example) small.

In addition, the above-mentioned pulse signal generation unit generates pulse signals with three different cycles Ta, Tb and Tc, and frequencies of the three pulse signals fa, fb, and fc are frequencies or combination of value close to frequencies that can be calculated by the following equations using m, a multiple of the limit of the detectable distance when the frequency is fa: $fb \approx fa*(m+N1)/m$, $fc \approx fa*m/(m+N2)$, $0<N1<m$, $0<N2<m$.

The use of this frequency combination prevents the pulse signals with cycle Ta, cycle Tb, and cycle Tc from being received at the same lag time during the time which the transmitted pulse signal is reflected by the objects that locates at a distance m times farther than the measurable limit.

It is also acceptable that the above-mentioned reflected signal identification unit identifies the reflected signal as a reflected signal of the pulse signal for reference only when the lowest value of the receiving intensity is not substantially zero.

These steps allows the identification of the reflected signal by the reflected signal identification unit without the influence of sending and receiving intervention because the identification of the intensity of the reflected signal is possible by taking the lowest value among the other intensities of the reflected signal data even though one of the reflected signal data recorded the large intensity by the sending and receiving intervention. Also, the measurable distance can be m times longer than the process limit because the lag times of the received signal reflected by the targets located at the range of that distance are not equal.

As explained above, according to the present invention, it is possible to provide pulse radar that completely eliminates the false echo (ghost signal) from distances beyond the measurable limit determined by the pulse cycle. It is also possible to provide a method and the device for measurement by pulse radar that enables detection beyond the repeating pulse cycle.

Based on FIG. 1B through FIG. 5, the explanation of the preferred embodiment of the present invention is provided below.

Figure 1B:
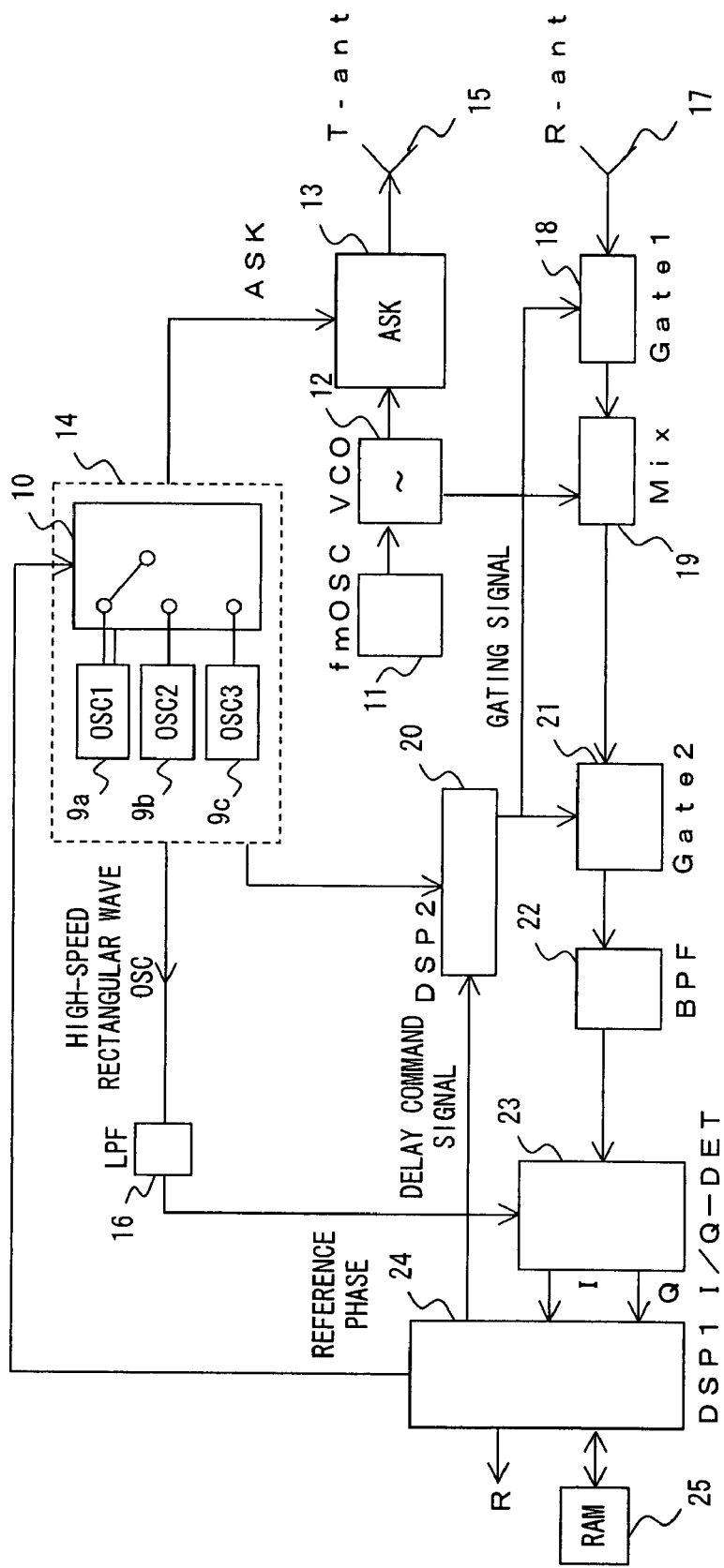
FIG. 1B is a block diagram that shows the configuration of the pulse radar relating to the preferred embodiment of the present invention.

FIG. 1B is a block diagram of the configuration of the pulse radar relating to the preferred embodiment of the present invention.

The pulse radar described in the FIG. 1B has fmOSC 11, high-frequency oscillator (VCO) 12, ASK switch circuit 13, high-speed rectangular wave OSC 14, and transmission antenna (T-ant) 15 in the transmission unit. There are low pass filter (LPF) 16, receiving antenna (R-ant) 17, Gate1 (high frequency gate) 18, receiving mixer (Mix) 19, Gate2 (IF band gate) 21, digital signal processor1 (DSP1) 24, band pass filter (BPF) 22, I/Q detector (I/Q-DET) 23, and digital signal processor2 (DSP2) 20 in the receiving unit. Moreover, high-speed rectangular wave OSC 14 comprises three OSCs 9a~9c that differ in the cycle of rectangular wave (repetitive pulse signal) generation, and OSC changer 10.

The fmOSC 11 outputs the triangular wave signal with frequency fm to high-frequency oscillator 12. High-frequency oscillator 12 is a voltage control oscillator that modulates the frequency based on the direct-current voltage value input from fmOSC 11, and as a carrier outputs the high-frequency FM wave, the modulated frequency proportional to the input voltage, to ASK switch circuit 13. ASK switch circuit 13 switches the carrier input from VCO 12 by the rectangular wave from high-speed rectangular wave OSC 14, and modulates with the ASK (Amplitude Shift Keying) method.

OSC 9a~9c is a high frequency oscillator that generates the rectangular wave of each different signal cycle Ta, Tb, and Tc (with frequencies of fa, fb, and fc, respectively). The output of these OSC 9a~9c can be switched to cycle T0 (the frequency is f0) by the OSC changer 10. In the present preferred embodiment, switching cycle T0 is 10 ms with the OSC changer 10. Therefore, signals are switched in order of OSC9a, OSC 9b and OSC 9c every 10 ms, and then are output from the high-speed rectangular wave OSC 14.

However, cycle T0 (frequency f0) is not limited to 10 ms only. Considering the capability of calculation of the DSP1 24, cycle may be determined, as the need arises, based on the frequencies with periods of more than Ta+Tb+Tc.

In the present preferred embodiment, the cycle Ta, Tb, and Tc are determined by the selection from the frequency calculated from the following equation (1)~(4) or the combination of close values of those calculated frequencies, where m is a multiple of the limit distance detectable with frequency fa (cycle Ta)

$$fb \approx fa*(m+N1)/m \quad (1)$$

$$fc \approx fa*m/(m+N2) \quad (2)$$

$$0<N1<m \quad (3)$$

$$0<N2<m \quad (4)$$

Suppose the limit of the detectable distance is 15 m with the frequency fa of 10 MHz. When the requested distance measurement is 45 m, then m is 3 (=detecting distance/the limit of the detectable distance=45/15), and N1 and N2 are either 1 or 2 from equations (3) and (4).

Therefore, in this case, the combination of fa, fb, and fc are the following four from equations (1) and (2):

$$(fa, fb, fc)=(10, 10*4/3, 10*3/4) \quad (5)$$

$$(fa, fb, fc)=(10, 10*4/3, 10*3/5) \quad (6)$$

$$(fa, fb, fc)=(10, 10*5/3, 10*3/4) \quad (7)$$

$$(fa, fb, fc)=(10, 10*5/3, 10*3/5) \quad (8)$$

Any combination among the equations (5) through (8) can be used. Taking an example of combination (6), (Ta, Tb, Tc) are (100 ns, 80 ns, 170 ns). In calculating equations (1) and (2), the answer may be indivisible. In that case, the approximated value can be taken. To be more specific, the value can be rounded off to a whole number or a multiple of 25 the closest to the calculated combination can be used with regards to the constraint on the accuracy of the oscillator.

Determination of Ta, Tb, and Tc in such way prevents the repeating timing of each frequency from overlapping at least during the reception of the reflected signals from targets within 45 m.

The high-speed rectangular wave OSC 14 distributes the rectangular wave from OSC, which is selected by OSC switch 10 to ASK switch circuit 13, DSP2 20 and I/Q detector 23. Also, The transmission antenna 15 sends out the signal output from ASK switch circuit 13.

Low pass filter 16 extracts only the fundamental wave component of fa, fb and fc from the output signal of high-speed rectangular wave OSC 14 and outputs them to I/Q detector 23. The receiving antenna 17 receives the signal reflected by the target, which was originally transmitted from the transmission antenna 15. The receiving antenna 17 inputs the signal as the received signal to Gate1 18.

Gate1 18 and Gate2 21 are High-speed AND gates. Based on the gating signal from DSP2 20, these gates control gating and output the data.

The receiving mixer 19 converts the high-frequency signal from the Gate1 18 by FM wave from high-frequency oscillator 12. DSP2 20 generates the gating signal by delaying the pulse signal from the high-speed rectangular wave OSC 14 based on the delay command signal from DSP1 24. The generated gating signal is sent to Gate1 18 and Gate2 21.

Band pass filter 22 extracts the component around the frequency fa, fb and fc form the output signal of Gate2 21, and send the component to I/Q detector 23. I/Q detector 23 employs the signal of low pass filter 16 as reference phase, detects the phase of the input signal from the band pass filter 22 and sends out both of the in-phase (Ich) and quadrature-phase (Qch) to DSP1 24.

DSP1 24 directs the delay time of the gating signal by the delay command signal from DSP2 20, calculates the lag time $\tau$ of the receiving signal so as the output of I/Q detector 23 is the maximum level, and stores the lag time $\tau$ and the received signal (the reflected signal) in the RAM (Random Access Memory) 25 that is volatile.

The data stored in the RAM 25 includes the transmitted signal (the pulse signal) switched by the cycle T0 in order of Ta, Tb and Tc, the reflected signal (I and Q phases from the I/Q detector 23), the intensity of the reflected signal, and the receiving time of the reflected signal.

From this data, DSP1 24 exclusively extracts the transmitted signal only with cycle Ta cycle Tb and cycle Tc, the reflected signal (I and Q phases from I/Q detector 23), the data of the receiving intensity of the reflected signal, and the data of the receiving time of the reflected signal, and generates the reflected signal data 1, the reflected signal data 2 and the reflected signal data 3.

The reflected signals are identified by comparing the reflected signal data 1 through the reflected signal data 3, and calculating the distance R from the target from the lag time $\tau$ of the identified reflected signal, and outputting the result, R.

For example, using the I and Q phases, the output from the I/Q detector (I/Q-DET) 23, high-speed rectangular wave OSC 14 repetition cycle T (T is Ta, Tb or Tc) of the transmitted pulse and the speed of light c, phase difference $\theta$, the lag time $\tau$, the distance to the target R can be calculated from the following equations:

$$\theta = \tan^{-1}(Q/I) \tag{9}$$

$$\tau = \theta * T/2\pi \tag{10}$$

$$R = \tau * c/2 = \theta * T * c/4\pi \tag{11}$$

As explained above, the pulse generation unit is realized by OSC 9a~9c, the pulse switching unit is realized by the OSC changer 10 and DSP 1 (digital signal processor 1) 24 and the pulse signal sending unit is realized by fmOSC 11, the high-frequency oscillator 12, ASK switch circuit 13, high-speed rectangular wave OSC 14 and the transmission antenna 15.

The reflected signal receiving unit is realized by low pass filter 16, the receiving antenna 17, the Gate1 18, the receiving mixer 19, DSP2 (digital signal processor 2) 20, the Gate2 21, the band pass filter 22, the I/Q detector 23, DSP1 (digital signal processor 1) 24, and RAM 25. The data received by the reflected signal receiving unit is stored in RAM 25.

Moreover, the reflected signal data acquisition unit, the reflected signal identification unit and the distance calculation unit are realized by DSP1 24 and RAM 25. The reflected signal data acquisition unit generates the reflected signal data 1, 2 and 3 from the received data and stores them in RAM 25. The reflected signal identification unit identifies the reflected signals by comparing those three reflected signal data 1, 2 and 3. The distance calculation unit calculates the distance of the pulse radar to the targets using the equations (9) through (11) with the lag time of the reflected signal, which was identified.

FIG. 2A to FIG. 2D are the charts showing the relationship between the detected signals and the reflected signals of the pulse signals that were transmitted to the four targets using the pulse radar relating to the preferred embodiment of the present invention.

Figure 2A:
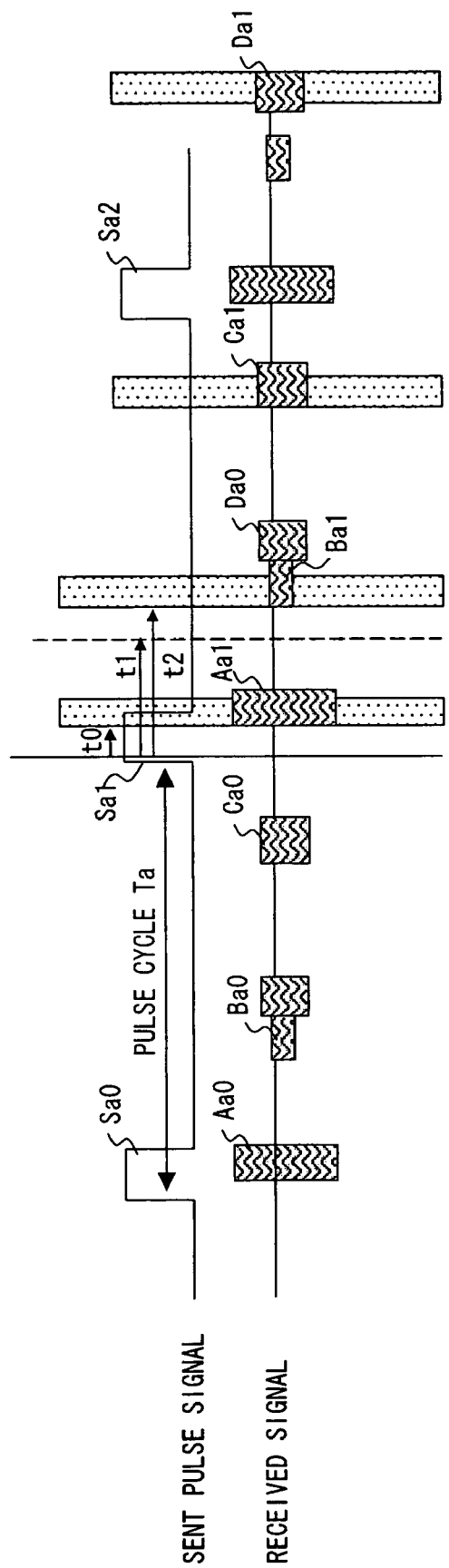
FIG. 2A is a chart that indicates the pulse signal with the pulse cycle Ta transmitted to the targets and its reflected signal.
Figure 2B:
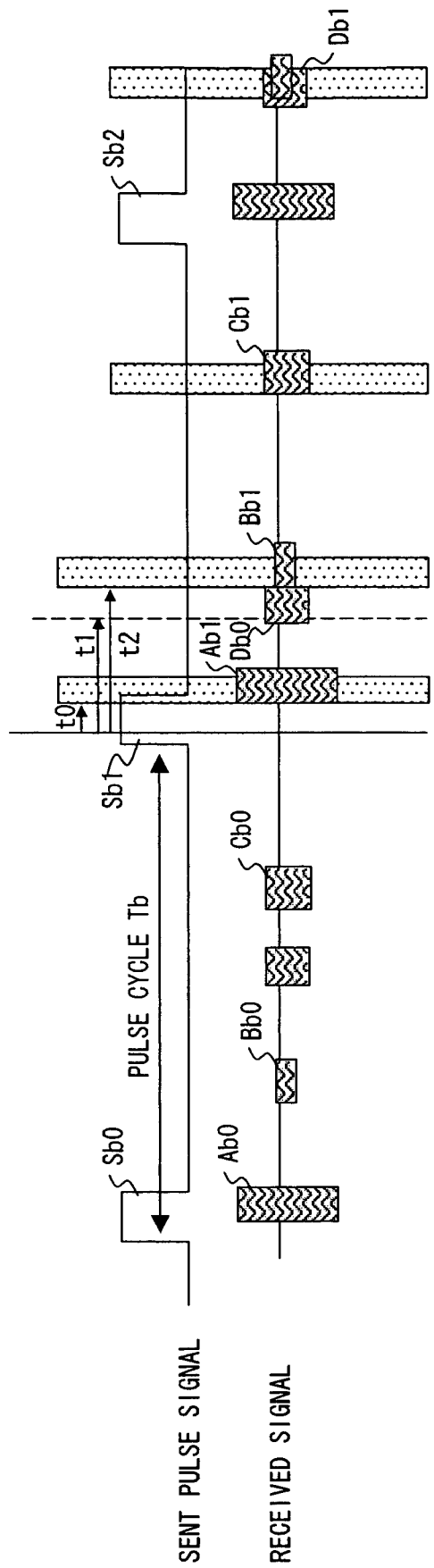
FIG. 2B is a chart that indicates the pulse signal with the pulse cycle Tb transmitted to the targets and its reflected signal.
Figure 2C:
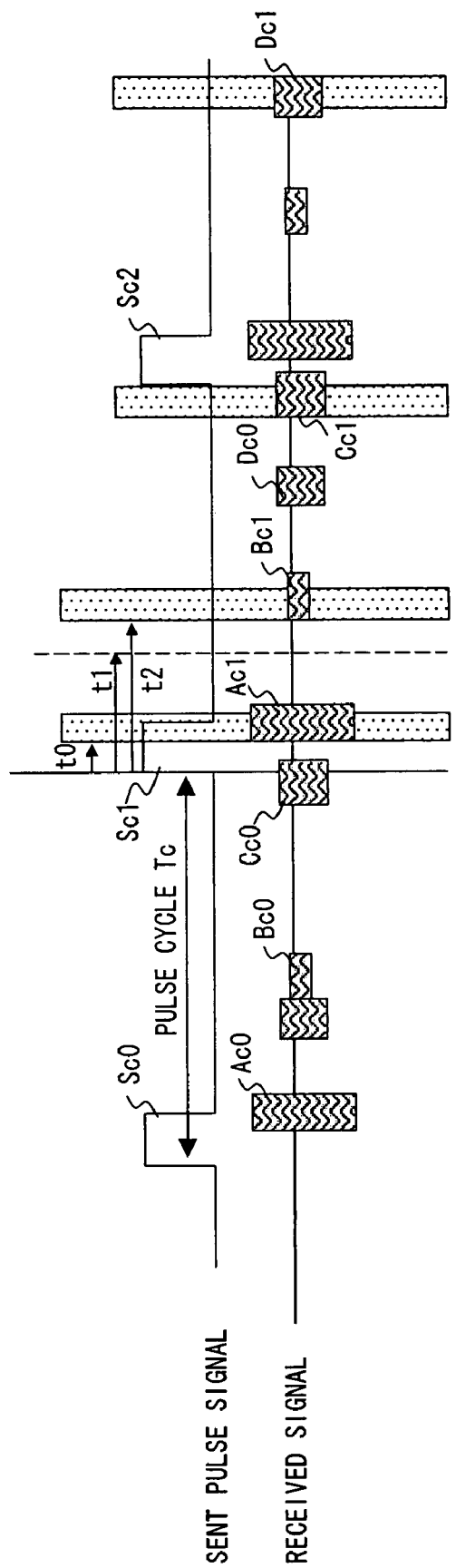
FIG. 2C is a chart that indicates the pulse signal with the pulse cycle Tc transmitted to the targets and its reflected signal.
Figure 2D:
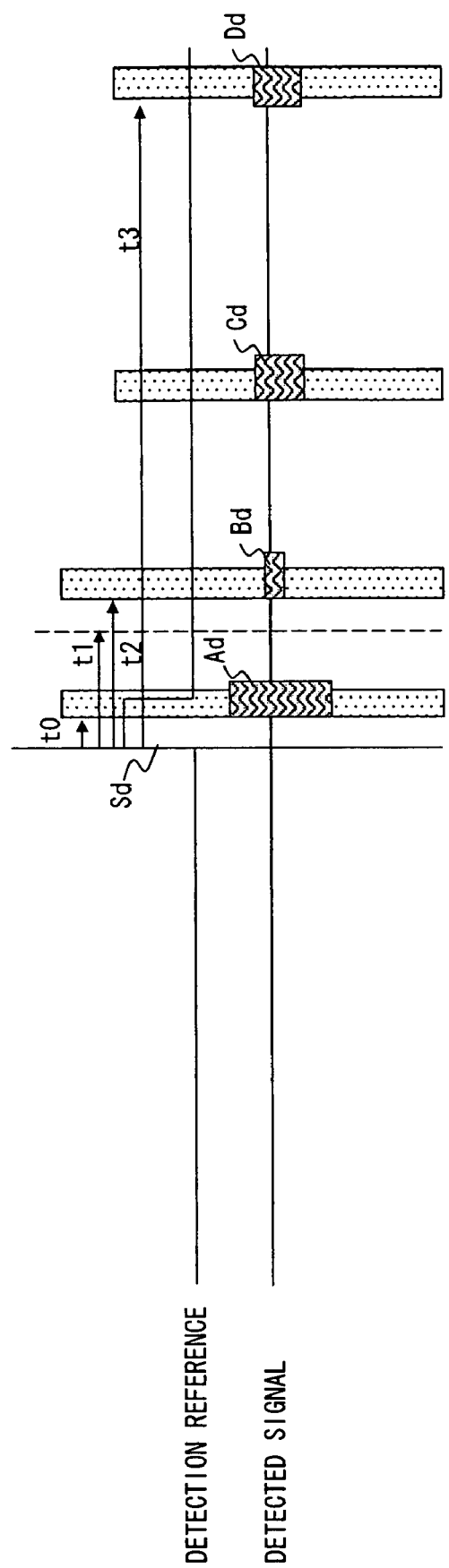
FIG. 2D is a chart that shows an arbitrary reference pulse signal for comparison of the reflected signals in FIG. 2A through FIG. 2C, and detected signal from the comparison of the reflected signal after the reference signal.

FIG. 2A shows both the pulse signal and its reflected signal when the pulse signal with cycle Ta, generated by OSC 9a, is transmitted to the targets. And FIG. 2A corresponds to the reflected signal data 1. FIG. 2B shows both pulse signal and its reflected signal when the pulse signal with cycle Tb, generated by OSC 9b, is transmitted to the targets. And FIG. 2B corresponds to the reflected signal data 2. FIG. 2C shows both the pulse signal and its reflected signal when the pulse signal with cycle Tc, generated by OSC 9c, is transmitted to the targets. And FIG. 2C corresponds to the reflected signal data 3. FIG. 2D shows the detected signal determined by the comparison of the arbitrary reference pulse signal and the reflected signal received after the reference pulse signal. The arbitrary reference pulse signal was determined as the reference (detection reference) in order to compare the reflected signal in FIG. 2A through FIG. 2C.

Sa0 through Sa2 indicated in FIG. 2A are the pulse signals with the cycle Ta transmitted to the targets. They are generated by OSC 9a. The reflected signals Aa0, Ba0, Ca0 and Da0 show the intensity of the reflected signals from the four targets, and the distance to each target varies. The intensity is shown in comparison with that of the pulse signal Sa0. Similarly, the reflected signals Aa1, Ba1, Ca1, and Da1 describes the intensity of the reflected signals from the above-mentioned targets, and the intensity is shown in comparison with that of the pulse signal Sa1.

It is shown that the reflected signal Da0 cannot be detected within a cycle from the pulse signal Sa0 transmission because the distance to the target is longer than the detectable distance limit of the cycle Ta. Thus, the signal cannot be distinguished, or separated, from the reflected signals (Aa1, Ba1 and Ca1, for example) of the next pulse signal Sa1. The reflected signal Da0 is hereafter addressed as ghost signal Da0 of the pulse signal Sa1.

The Sb0 through the Sb2 indicated in FIG. 2B are the pulse signals with the cycle of Tb transmitted to the targets. They are generated by OSC 9b. The reflected signals Ab0, Bb0, Cb0 and Db0 show the intensity of the reflected signals from the same targets used in FIG. 2A. The reflected signals Ab1, Bb1, Cb1, and Db1 describes the intensity of the reflected signals from the above-mentioned targets, and the intensity is shown in comparison with that of the pulse signal Sb1.

The reflected signal Db0 is the ghost signal of the pulse signal Sb1 because the distance to the target is greater than the distance limit, which is detectable with the cycle Tb. The ghost signal Db0 cannot be distinguished from the reflected signals of the pulse signal Sb1.

The Sc0 through the Sc2 indicated in FIG. 2C are the pulse signals with the cycle Tc transmitted to the targets. They are generated by OSC 9c. The reflected signals Ac0, Bc0, Cc0 and Dc0 show the intensity of the reflected signals from the same targets used in FIG. 2A. The reflected signals Ac1, Bc1, Cc1, and Dc1 describes the intensity of the reflected signals of the pulse signal Sc0 from the above-mentioned targets, and the intensity is shown in comparison with that of the pulse signal Sc1.

The reflected signal Dc0 is the ghost signal of the pulse signal Sc1 because the distance to the target is beyond the distance limit, which is detectable with the cycle Tc. The ghost signal Dc0 cannot be distinguished from the reflected signals of the pulse signal Sc1.

The pulse signal Sd in FIG. 2D shows the arbitrary pulse timing reference. The pulse timing reference is the reference to compare the reflected signals described in FIG. 2A through FIG. 2C. In this preferred embodiment, the pulse signal Sa1 in FIG. 2A, the pulse signal Sb1 in FIG. 2B, and the pulse signal Sc1 in FIG. 2C are selected as the pulse timing reference and the reflected signals are compared based on the reference.

However, these pulse timing references are arbitrary. Thus although the pulse signal Sa1, Sb1 and Sc1 are selected to be the pulse timing reference in the present preferred embodiment, the pulse signal Sa0, Sb0 and Sc0, for example, can be the pulse timing reference. Also, the pulse signals Sa0, Sb1 and Sc0 can be the pulse timing reference.

The detected signal in FIG. 2D is the signal having the lowest intensity of all on the comparison of the reflected signals that are detected after the pulse timing reference (at the transmission of the pulse signal Sa1) in FIG. 2A, the reflected signals that are detected after the pulse timing reference (at the transmission of the pulse signal Sb1) in FIG. 2B, and the reflected signals that are detected after the pulse timing reference (at the transmission of the pulse signal Sc1) in FIG. 2C. The signal is selected to be the reflected signal of the pulse signal Sd in the pulse timing reference.

For example, in the case of the lag time from the pulse timing reference is t0, the intensity of the reflected signal Aa1 (FIG. 2A), the reflected signal Ab1 (FIG. 2B) and the reflected signal Ac1 (FIG. 2C) are detected. The intensity of these signals is compared and the reflected signal with the lowest intensity is selected as the detected signal Ad.

Also, when the lag time from the pulse timing reference is t1, although the intensity of the ghost signal Db0 is detected in the reflected signal data of Sb1 in FIG. 2B, the intensity is not detected in the reflected signal data in FIG. 2A and FIG. 2C (The intensity is substantially zero). Therefore, when the intensity of these signals is compared, the lowest intensity is zero. Then, the ghost signal Db0 is not detected.

Here, that the intensity is substantially zero means the intensity is regarded as zero even though the actual intensity is not zero because noise is received instead of the reflected signal. Therefore, depending on the accuracy of the reflected signal receiving unit of the pulse radar, the range of the intensity that is substantially zero should be determined, and based on the range, the zero intensity, or the absence of the reflected signals, is judged.

As explained above, by comparing the reflected signals (the intensity) of the pulse signals with different cycles, the reflected signal of the pulse signal, which serves as the reference (the pulse timing reference), can be identified without difficulty, and moreover, the ghost signals can be securely eliminated.

Also, in transmitting the pulse signal by the pulse signal sending unit, Gate1 18 in the reflected signal receiving unit is closed in order to avoid receiving the devices output signals, however, sometimes those signals are received by the pulse signal receiving unit (transmitting and receiving intervention). A possible cause of this intervention is the transmission of the signal inside the pulse radar.

Therefore, the reflected signal was received at the time of this transmitting and receiving intervention, it was difficult to clarify whether the received signal was the reflected signal or the signal by the transmitting and receiving intervention, that is, the received signal was not the reflected signal. However, the comparison of the reflected signal (the intensity) of the pulse signal with different repetition cycle enables the recognition of the reflected signal or the intensity even in the transmitting and receiving intervention.

Further, even when the lag time before the reception of the reflected signal of the reference pulse signal (the lag time t3 in FIG. 2D) is longer than the repetition cycle (Ta, Tb and Tc, for example), the reflected signal of the reference pulse signal can be still detected.

FIG. 3 is a flowchart that shows the details of the reflected signal identification process.

When the operation of the pulse radar explained in FIG. 1B starts, at Step S301, DSP1 24 commands the OSC changer 10 to choose OSC 9a, and the pulse signal (high-speed rectangular wave) with the cycle Ta is transmitted by the pulse signal sending unit through ASK modulation to the target.

The reflected signal receiving unit recieves a signal, the intensity of the reflected signal is measured (by sliding the lag time to detect) and the data is stored in RAM 25. In the present preferred embodiment, the OSC changer switches over at 20 kHz, therefore, after 50 μs of the intensity measurement, the step is incremented to S302.

In Step S302, DSP1 24 commands to the OSC changer 10 to choose OSC 9b, and the pulse signal (high-speed rectangular wave) with cycle Tb is transmitted by the pulse signal sending unit through ASK modulation to the target. The reflected signal receiving unit receives a signal, the intensity of the reflected signal is measured (by sliding the lag time to detect) and the data is stored in RAM 25. After 50 μs of the intensity measurement, the step is incremented to S303.

Like Steps S301 and S302, in Step S303, DSP1 24 commands to OSC changer 10 to chose OSC 9b, the pulse signal (high-speed rectangular wave) with the cycle Tc is transmitted by the pulse signal sending unit through ASK modulation, the intensity of the reflected signal is measured by the reflected signal receiving unit (by sliding the lag time to detect) for 50 μs, and the data is stored in the RAM 25.

Here, the intensity of the reflected signal is measured by sliding the lag time by opening and closing the Gate1, the reflected signals are detected intermittently or continuously during a predetermined time period.

After the processes of Step S301 through Step S303 that measure the intensity of the reflected signal of the pulse signal with different cycles Ta, Tb and Tc, the process moves to Step 304.

In Step 304, DSP1 24 reads out the receiving data stored in the RAM 25, and generates the reflected signal data1 (see FIG. 2A), the reflected signal data2 (see FIG. 2B) and the reflected signal data3 (see FIG. 2C).

The pulse timing references are determined on each reflected signal data, the intensity of a certain interval (hereafter addressed as the minced time) during the lag time t (the initial value is 0s) from the pulse timing reference of each reflected signals is compared, and the lowest intensity of each reflected signal is specified.

In the present preferred embodiment, the minced time is set as 0.5 ns, therefore, when the cycle Ta is 100 ns, each cycle is divided into 200 fine intervals and the intensity is compared in each of those intervals one after another.

When the lowest intensity is specified, the step is moved to Step S305 where whether the lowest intensity specified in Step S304 is substantially zero or not is determined. For example, when the highest intensity is $50 \times 10^{-3}$ mW, considering the noise, the intensity below 0.1% of the highest intensity is judged as substantially zero, and it is decided to be a signal with zero intensity.

In Step S305, in the case of no intensity existing, the process is moved to Step S306 where the lag time t is incremented by the minced time, 0.5 ns, and later is moved back to Step S304. Steps S304 through Step S306 are repeated until an intensity that is not substantially zero is found.

When the intensity is detected in Step S305, the process is moved to Step S307 where distance R to the target is calculated applying the lag time t as τ to the equations (9), (10) and (11). τ is the lag time after which the nonzero intensity is detected.

When the lag time t is longer than 100 ns, the new lag time t is set at Step S306. The process moves to Step S301, and repeats Step S301 through step S307. When the lag time is shorter than 100 ns, the lag time t is incremented by the minced time 0.5 ns at Step S306. The process is moved to Step S304, and Step S304 through step S307 are repeated.

In the processes explained above, in the Steps from S301 to S303, the reflected signal intensity of the pulse signals with the cycle Ta, Tb and Tc is measured in a certain period of time (10 ms for the present preferred embodiment), and later the intensity of reflected signals from the targets are obtained by the processes of Step S304 through Step S306. However, it is possible to determine the intensity of the reflected signals from the targets by measuring only the intensity (for example, the lag time t0 in FIG. 2A through FIG. 2C) of the lag time t controlling the Gate1 18. The lag time τ slides, or increments successively as τ+Δτ. The processes for this case are described in FIG. 4.

Figure 4:
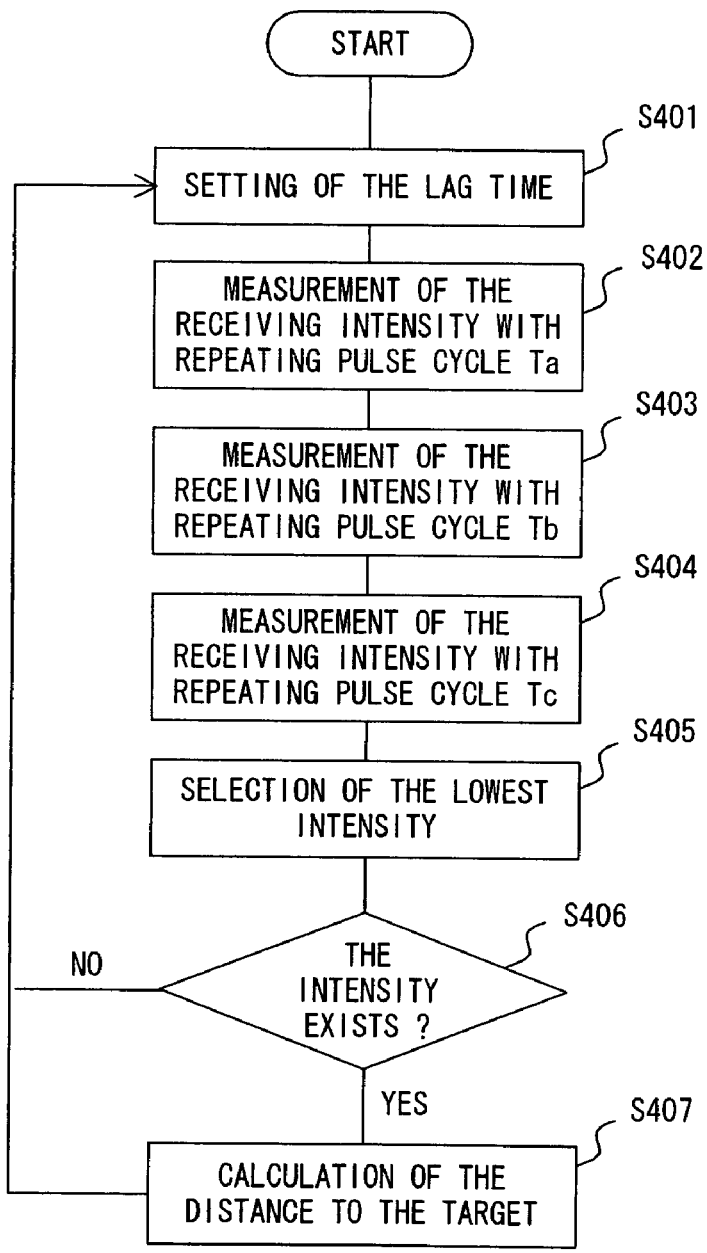
FIG. 4 is a flowchart showing an example variation of the reflected signal identification process.

FIG. 4 is a flowchart that describes the variation example of the reflected signal identification process.

In starting the operation of pulse radar as it is described in FIG. 4, the lag time t is set (the initial value is 0.5 ns, for example) at Step S401.

The process is moved to Step S402, DSP1 24 commands to OSC changer 10 to choose OSC 9a, and the pulse signal (high-speed rectangular wave) with the cycle Ta is transmitted by the pulse signal sending unit through ASK modulation.

Only at the time when the lag time t from the pulse timing reference is reached, is the intensity measured by opening Gate1 18 of the reflected signal receiving unit, and the data is stored in the RAM 25. (The time period Gate1 18 is open for, is for example, 0.5 ns)

After the completion of the intensity measurement DSP1 24 moves the process to Step S403, commands to OSC changer 10 to chose OSC 9b, and the pulse signal (high-speed rectangular wave) with the cycle Tb is transmitted by the pulse signal sending unit through ASK modulation.

Only at the time point when it reached the lag time t from the pulse timing reference, is the intensity is measured by opening Gate1 18 of the reflected signal receiving unit, and the data is stored in the RAM 25.

In addition, after the completion of the intensity measurement DSP1 24 moves the process to Step S404, commands to OSC changer 10 to choose OSC 9c, and the pulse signal (high-speed rectangular wave) with the cycle Tc is transmitted by the pulse signal sending unit through ASK modulation, and only at the time point when it reached the lag time t from the pulse timing reference, is the intensity measured by opening Gate1 18 of the reflected signal receiving unit, and the data is stored in the RAM 25.

Here, the pulse timing reference of the process of Step S402 through Step S404 is that any one of the pulse signals transmitted from the pulse signal sending unit is selected and the selected timing of the transmission is set as the reference.

Also, the switch cycle T0 by OSC changer 10 is 50 μs in the present preferred embodiment. Therefore the pulse signal is output from the high-speed rectangular wave OSC 14 switching in the order of OSC 9a, OSC 9b, and OSC 9c every 50 μs.

By the processes of Step S402 through Step S404, the measurement of the intensity at the lag time t from the reference pulse timing of each cycle Ta, Tb, and Tc is completed, and the process is moved to Step S405.

In Step S405, DSP1 24 reads out the receiving data stored in the RAM 25, and generates the reflected signal data1, the reflected signal data2, and the reflected signal data3. The intensities are compared and the lowest intensity is specified.

In the present preferred embodiment, the reflected signal data1 is the data of the intensity measured during the opening period of Gate1 18 in the lag time t (0.5 ns, for example). Therefore, compared with the reflected signal data described in FIG. 3, this data differs in that the time period of the measurement is much shorter. The reflected signal data 2 and the reflected signal data 3 also differ from those in FIG. 3 in the same way.

When the lowest intensity is specified, the step is moved to Step S406 where it is determined whether the lowest intensity specified in Step S405 is substantially zero or not. As it was explained in FIG. 3, for example, when the highest intensity is $50 \times 10^{-3}$ mW, considering the noise, the intensity below 0.1% of the highest intensity is judged as substantially zero, and it is judged to be a signal with zero intensity.

In Step S406, in the case of a signal with no intensity, the process is moved to Step S401 where the lag time t is incremented by the minced time, 0.5 ns. Step S401 through Step S406 will be repeated until an intensity that is not substantially zero is found.

When the intensity is detected in Step S406, the process is moved to Step S407 where distance R to the target is calculated by applying the lag time t as τ to the equations (9), (10) and (11). τ is the lag time after which a nonzero intensity is detected.

In the processes explained above, the intensity of reflected signals from the targets are given by measuring the intensity only at the point time of the predetermined lag time τ by the opening and closing control of Gate1 18, a quick detection of the intensity made possible at the predetermined lag time τ. And by successively sliding, or incrementing, the lag time τ to τ+Δτ, the intensity of the reflected signals within the range of the predetermined lag time is detected quickly. That is, it is possible to quickly detect the intensity within a specific distance range.

The reflected signal data1, the reflected signal data2 and the reflected signal data3, shown in FIG. 3 are continuously acquired and the data of the transmission signal measured at 10 ms intervals, the reflected signal of the transmitted signal (I and Q phases from I/Q detector 23), the intensity of the reflected signal and the timing of reflected signal reception, regardless of whether the intensity is detectable or not as it was described in FIG. 2A through FIG. 2C. And the obtained data is stored in the RAM 25. However, it is also possible that this data is stored only when the intensity is detected by the reflected signal unit.

That is, in the processes of the intensity measurement, Step S301 through Step S303, the intensity that is input to DSP1 24 can be judged to be substantially zero or not by the same process as Step S305, and only when the intensity is not substantially zero (the intensity exists), the data should be stored in the RAM 25.

FIG. 5 shows the example data of the reflected signal data1, the reflected signal data2 and the reflected signal data3. The measurement result is stored only when the intensity exists.

As it is described in FIG. 5, the reflected signal data1 26, the reflected signal data2 27 and the reflected signal data3 28 and detection result 29 are the tables consists of the intensity and the lag time of the intensity detection.

As it is stated above, by the process of the intensity measurement in Step S301 through Step S303, in the reflected signal data1 26, eight of the intensity were detected at the lag time of 6 ns, 20 ns, . . . , 98 ns. The intensity and the lag time are stored in the RAM 25. The data for the reflected signal data2 27 and the reflected signal data3 28 are also stored in the same way.

The lag time of the reflected signal data1 26, the reflected signal data2 27 and the reflected signal data3 28 are compared, and when the intensity is detected at the same lag time, the lowest intensity is selected and a table such as the detection result 29 is made. The table is stored in the RAM 25.

For example, DSP1 24 successively compares the lag time of the reflected signal data1 26 and that of the reflected signal data2 28 stored in the RAM 25. When the same lag time is found, DSP1 24 searches for the same lag time in the reflected signal data3 28.

When the same lag time in the reflected signal data 1 through 3 is found, the intensity of each data is compared and the lowest intensity is recorded with the lag time in the detection result 29.

For example, in FIG. 5, DSP1 24 detects the lag time of 6 ns that is common to the reflected signal data1 26 and the reflected signal data2 27, DSP1 24 searches for the lag time of 6 ns in the reflected signal data3 28. In FIG. 5, the lag time of 6 ns is in the reflected signal data3 28. On comparison of each intensity at the lag time of 6 ns, the lowest intensity is stored in the detection result 29. (In FIG. 5, all the intensity of the lag time of 6 ns is $33 \times 10^{-3}$ mW, therefore, the lowest intensity is $33 \times 10^{-3}$ mW).

When the table of the detection result 29 is completed, DSP1 24 calculates the distance R to the targets by using the equations (9), (10) and (11) applying the lag time τ stored in the detection result 29.

The above-explained process allows a big reduction in the memory (RAM25 for the present case) capacity that is required for the results of the intensity measurements.

In the explanations above, the example of the pulse signals with three different cycle, Ta, Tb and Tc, were used. However, the number of the different cycles is not limited. It is possible to acquire similar results from the pulse signals with two or more different cycles. The number of different cycles can be flexibly set considering the scale of the circuit, the cost, and the measurement accuracy required.

In addition, in the example of FIG. 1B, the order of the pulse signal with the cycle of Ta, Tb and Tc that are switched by OSC changer 10 is not fixed and can be any known order.

What is claimed is:

1. A pulse radar, comprising:
a pulse signal generation unit for generating pulse signals with at least two different cycles;
a pulse signal switching unit for switching the pulse signals generated in the pulse signal generation unit in a predetermined interval and outputting the signals;
a pulse signal sending unit for sending the pulse signals from the pulse signal switching unit toward objects;
a reflected signal receiving unit for receiving reflected signals from the objects, and storing receiving data that contains at least data of receiving intensity of the reflected signals and a receiving time of the reflected signals in its storage unit;
a reflected signal data acquisition unit for obtaining reflected signal data of every reflected signal for all the pulse signals with different cycle from the receiving data stored by the reflected signal receiving unit; and
a reflected signal identification unit for evaluating the receiving intensity of the reflected signals received during a predetermined time period after transmission of a reference pulse signal on each of the reflected signal data of the pulse signals with different cycles obtained by the reflected signal data acquisition unit to determine a lowest value of the receiving intensity, and identifying the reflected signal as a reflected signal of the reference pulse signal only when the lowest value is at least as large as a predetermined receiving intensity.

2. The pulse radar according to claim 1, wherein the reflected signal receiving unit receives a reflected signal from the objects only in a requested time period, and stores data containing at least the receiving intensity of the reflected signal in the requested time period in the storage unit, and the reflected signal identification unit compares receiving intensity of the reflected signal in the requested time period on each of the reflected signal data obtained by the reflected signal data acquisition unit, and identifies the reflected signal as a reflected signal of the reference pulse signal only when all the receiving intensity compared is not substantially zero.

3. The pulse radar according to claim 1, wherein the reflected signal receiving unit stores only data of receiving intensity of the reflected signal from the objects and of the lag time of the reflected signal in the storage unit.

4. The pulse radar according to claim 1, wherein the pulse signal generation unit generates pulse signals with three different cycles Ta, Tb and Tc, and frequencies of the three pulse signals fa, fb, and fc are frequencies or combination of value close to frequencies that can be calculated by the following equations using m, a multiple of the limit of the detectable distance when the frequency is fa:

$fb = fa*(m+N1)/m,$ $fc = fa*m/(m+N2),$ $0 < N1 < m,$ $0 < N2 < m.$

5. The pulse radar according to claim 1, wherein the reflected signal identification unit identifies the reflected signal as a reflected signal of the pulse signal for reference only when the lowest value of the receiving intensity is not substantially zero.

6. A method of distance measurement by the pulse radar, comprising:
   a pulse signal generation process that generates pulse signals with at least two different cycles;
   a pulse signal switching process that switches the pulse signals generated in the pulse signal generation process in a predetermined interval and outputs the signals;
   a pulse signal sending process that sends the pulse signals from the pulse signal switching process toward objects;
   a reflected signal receiving process that receives reflected signals from the objects, and stores receiving data that contains at least a data of a receiving intensity of the reflected signals and a receiving time of the reflected signals in its storage unit;
   a reflected signal data acquisition process that obtains reflected signal data of every reflected signal for all the pulse signals with different cycle from the receiving data stored by the reflected signal receiving process; and
   a reflected signal identification process that evaluates the receiving intensity of reflected signals received during a predetermined time period after a transmission of a reference pulse signal on each of the reflected signal data of the pulse signals with different cycles obtained by the reflected signal data acquisition process to determine a lowest value of the receiving intensity, and identifies the reflected signal as a reflected signal of the reference pulse signal only when the lowest value is as large as a predetermined receiving intensity.

7. The method according to claim 6, wherein the reflected signal receiving process receives a reflected signal from the objects only in a requested time period, and stores data containing at least the receiving intensity of the reflected signal in the requested time period in the storage unit, and the reflected signal identification process compares receiving intensity of the reflected signal in the requested time period on each of the reflected signal data obtained by the reflected signal data acquisition process, and identifies the reflected signal as a reflected signal of the reference pulse signal only when all the receiving intensity compared is not substantially zero.

8. The method according to claim 6, wherein the reflected signal receiving process stores only data of receiving intensity of the reflected signal from the objects and of the lag time of the reflected signal in the storage unit.

9. The method according to claim 6, wherein the pulse signal generation process generates pulse signals with three different cycles Ta, Tb and Tc, and frequencies of the three pulse signals fa, fb, and fc are frequencies or combination of value close to frequencies that can be calculated by the following equations using m, a multiple of the limit of the detectable distance when the frequency is fa:

$fb = fa*(m+N1)/m,$ $fc = fa*m/(m+N2),$ $0 < N1 < m,$ $0 < N2 < m.$

10. The method according to claim 6, wherein the reflected signal identification process identifies the reflected signal as a reflected signal of the pulse signal for reference only when the lowest value of the receiving intensity is not substantially zero.

11. A pulse radar, comprising:
    a pulse signal generation means for generating pulse signals with at least two different cycles;
    a pulse signal switching means for switching the pulse signals generated in the pulse signal generation means in a predetermined interval and outputting the signals;
    a pulse signal sending means for sending the pulse signal from the pulse signal switching means toward objects;
    a reflected signal receiving means for receiving reflected signals from the objects, and storing receiving data that contains at least data of a receiving intensity of the reflected signals and a receiving time of the reflected signals in its storage unit;
    a reflected signal data acquisition means for obtaining reflected signal data of every reflected signal for all the pulse signals with different cycle from the receiving data stored by the reflected signal receiving unit; and
    a reflected signal identification means for evaluating receiving intensity of reflected signals received during a predetermined time period after a transmission of a reference pulse signal on each of the reflected signal data of the pulse signals with different cycles obtained by the reflected signal data acquisition means to determine a lowest value of the receiving intensity, and identifies the reflected signal as a reflected signal of the reference pulse signal only when the lowest value is at least as large as a predetermined receiving intensity.

12. A computer-readable medium encoded with a computer program that when executed controls a computer to perform a method of distance measurement by pulse radar, said method comprising:
    generating pulse signals that switch between at least two different cycles at predetermined intervals;
    receiving reflected signals and storing at least a receiving intensity of the reflected signals and a receiving time of the reflected signals as reflected signal data; and
    evaluating the receiving intensity of the reflected signals received during a predetermined time period after a transmission of a reference pulse signal with respect to the reflected signal data for each of the pulse signals during the at least two different cycles to determine a lowest value of the receiving intensity, and to identify the reflected signal as a reflected signal of the reference pulse signal only when the smallest receiving intensity is at least as large as a predetermined value.

* * * * *